United States Patent [19]

Dickie

[11] Patent Number: 4,516,347
[45] Date of Patent: May 14, 1985

[54] FISHING NET

[75] Inventor: Harold G. Dickie, Stewiacke, Canada

[73] Assignee: Dickie Investments Incorporated, Colchester, Canada

[21] Appl. No.: 559,694

[22] Filed: Dec. 9, 1983

[30] Foreign Application Priority Data

Sep. 15, 1983 [CA] Canada ................................. 436801

[51] Int. Cl.³ ............................................ A01K 77/00
[52] U.S. Cl. ...................................................... 43/11
[58] Field of Search ...................................... 43/11, 12

[56] References Cited

U.S. PATENT DOCUMENTS

| | | | |
|---|---|---|---|
| 1,007,758 | 11/1911 | White | 43/11 |
| 2,457,922 | 1/1949 | Robinson | 43/12 |
| 2,510,186 | 6/1950 | Marico | 43/11 |
| 2,653,403 | 9/1953 | Oslund | 43/11 |
| 3,012,351 | 12/1961 | Vieaux | 43/12 |
| 3,715,829 | 2/1973 | Hamilton | 43/12 |
| 4,031,650 | 6/1977 | Popeil | 43/12 |

FOREIGN PATENT DOCUMENTS 437388 10/1946 Canada ................................. 43/12

Primary Examiner—Gene P. Crosby
Attorney, Agent, or Firm—Cushman, Darby & Cushman

[57] ABSTRACT

A net structure includes a handle having a rigid hoop secured thereto. A flexible bag having an openable top portion defining the mouth of the bag has a plurality of connector means secured at spaced intervals thereto. These connector means are also freely slidably attached to the rigid hoop to pendantly secure the bag to the hoop. These connector means are moveable from a relative positional arrangement wherein they are spaced apart about the hoop to define the open mouth position of the bag to a second relative positional arrangement wherein such connector means are grouped together on the hoop to define the closed mouth position of the bag. An elastic member is connected between selected ones of the connector means such that as the latter are made to slide along the hoop between the first and second relative positional arrangements, the distance between said selected ones of the connector means is varied. As this variation occurs, the elastic member is first made to increase in length and then allowed to decrease in length and to at least partially relax whereby to assist in resiliently retaining the bag in both the open mouth and closed mouth positions thereof and/or resiliently biasing the bag toward the open and closed mouth positions thereof.

10 Claims, 6 Drawing Figures

U.S. Patent  May 14, 1985  Sheet 1 of 3  4,516,347
FIG. 1
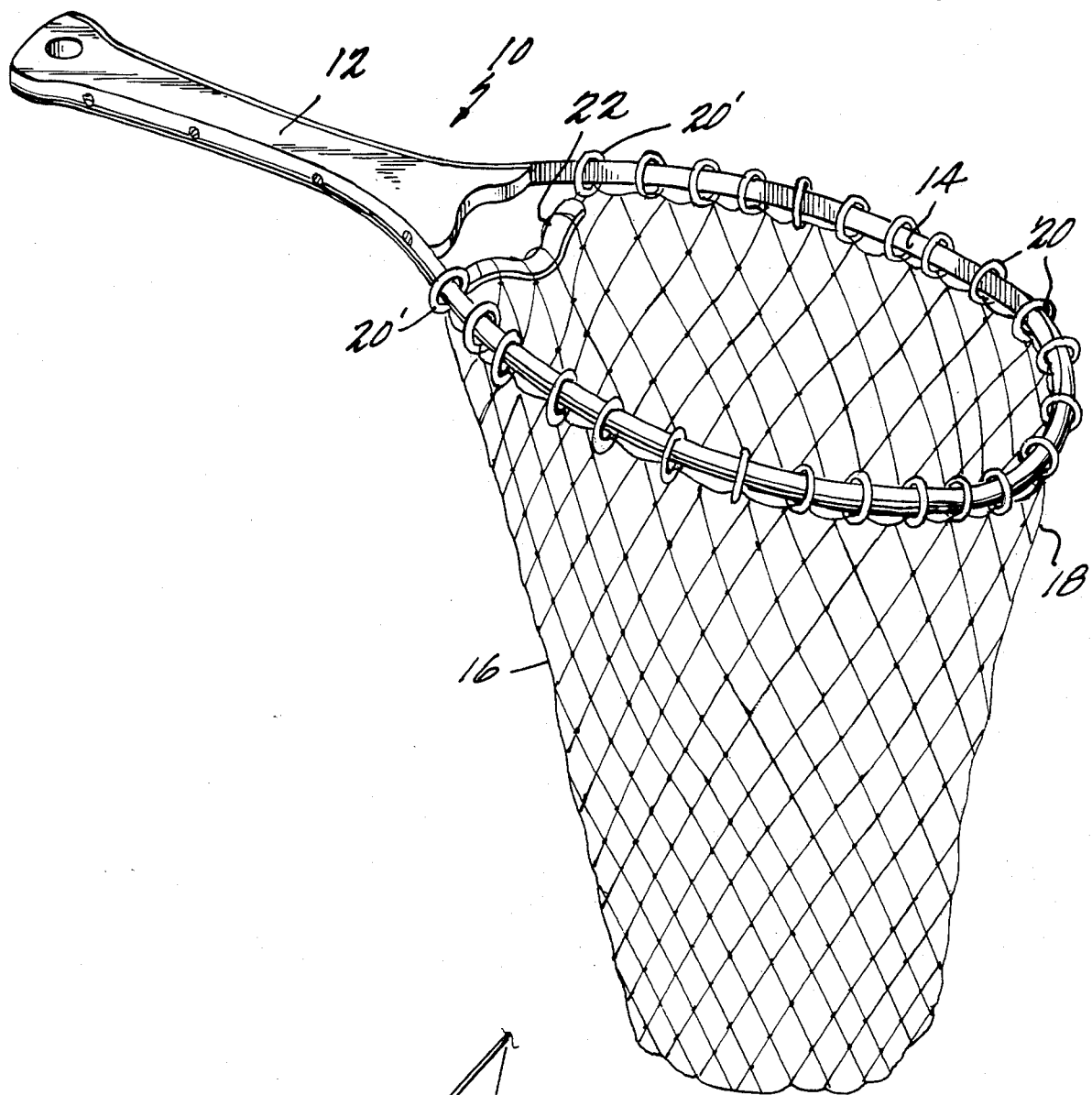
FIG. 1A

FISHING NET

BACKGROUND OF THE INVENTION

This invention relates to an improved net structure and has particular reference to improvements in so-called landing nets or dip nets.

The prior art has provided various mechanisms for closing the normally open top of the landing net to prevent the escape of a fish which has been collected in the net. By way of example, U.S. Pat. No. 2,653,403 issued Sept. 29, 1953 to Oslund discloses a hoop having a handle projecting from one side of same, with a net suspended from the hoop and slideable along opposite sides between an open and a closed position. The patent discloses spring actuated means operatively connected to the net for closing it instantly by gathering it at the side of the hoop with latch means disposed to retain the spring actuated means in a retracted position and said net in open position. The mechanism incorporates a latch lever and by pressing a portion on the latch lever, a plunger is released thus causing a crossbar to be projected toward the closed position as shown in Fig. 2 of the patent. During this movement, the crossbar gathers the net by sliding the rings by which the net is supported along the sides of the hoop to the side opposite the handle. The mechanism described in this patent is obviously quite complex and thus relatively expensive and the numerous parts may create maintenance problems. U.S. Pat. No. 2,457,922 issued Jan. 4, 1949 to Robinson shows another form of net structure, the mouth of which is rapidly closeable to prevent the escape of fish therefrom. In this patent, the hoop which supports the net is made into semi-circular sections which are hinged together for movement between open and closed positions. Each half of the hoop is connected to an elongated rod portion, the outer ends of which are connected to separate handles which are manipulated by the fisherman to open and close the mouth of the net. Again, the structure is fairly complicated, requiring a specially designed hoop and handle structure, thus increasing costs considerably. Since the handles must be manipulated in a particular fashion to open or close the net, the action may not be as rapid as is desired.

Numerous other forms of collapsable landing nets have been devised but most of these are not suited to or capable of providing a rapid or almost instantaneous action, which action is necesssary when one is in the course of landing fish. To be effective, the mechanism must be extremely simple and arranged such that the closure action does not require the use of both hands or any complex manipulation of the landing net handle. Structural simplicity is greatly to be preferred since such landing nets have to be carried by the user, often for great distances through the bush in a haversack or the like, and if the mechanism is at all complex there is a possibility of it becoming damaged or fouled to the extent that it will not work properly. It is also highly desireable that the closure mechanism be arranged so as to permit the use of what is essentially a standard hoop and handle arrangement thereby to keep the additional cost imposed by the closure mechanism down to an absolute minimum.

SUMMARY OF THE INVENTION

It is a general object of the present invention to provide a net structure, particularly a landing net structure suitable for use by fisherman, which greatly alleviates the problems noted above in connection with the prior art devices and which is capable of essentially satisfying the various desirable attributes noted above with particular regard to simplicity, ease of manufacture, low cost, ease of use and the like.

A net structure in accordance with one aspect of the invention includes a handle having a rigid hoop secured thereto. A flexible bag having an openable top portion defining the mouth of the bag has a plurality of connector means secured at spaced invervals thereto. These connector means are also freely slidably attached to the rigid hoop to pendantly secure the bag to the hoop. These connector means are moveable from a relative positional arrangement wherein they are spaced apart about the hoop to define the open mouth position of the bag to a second relative positional arrangement wherein such connector means are grouped together on the hoop to define the closed mouth position of the bag. As a characteristic feature of the invention, an elastic member is connected between selected ones of the connector means such that as the latter are made to slide along the hoop between the first and second relative positional arrangements, the distance between said selected ones of the connector means is varied. As this variation occurs, the elastic member is first made to increase in length and then allowed to decrease in length and to at least partially relax whereby to assist in resilently retaining the bag in both the open mouth and closed mouth positions thereof. Stated differently, the elastic member acts to resiliently bias the bag toward either the open mouth or closed mouth position thereof.

In a preferred form of the invention the handle is secured to the hoop such as to block the travel of the connector means completely around the hoop. The selected ones of the connector means comprise a selected pair. The above noted elastic member is connected to the members of the selected pair of connector means which, in use, are positioned on opposing sides of and most closely adjacent to the region of securement of the handle to the hoop when the bag is in the open mouth position.

Preferably, the bag is of an open-mesh fabric and the above noted connector means each comprises a ring-like loop which embrances the rigid hoop and is freely slideable thereon. The elastic member Preferably comprises an elongated strip of elastomeric material.

The above noted hoop is preferably of a generally oval outline shape with a handle aligned with the long axis of the oval outline.

The invention will be more readily understood from the following detailed description of a preferred embodiment of same taken in conjunction with the appended drawings.

BRIEF DESCRIPTION OF THE VIEW OF DRAWINGS

FIG. 1 is a perspective view of a landing net structure in accordance with present invention, the mouth of the net being shown in the open condition;

FIG. 1A is a view illustrating the manner in which the landing of a fish is commenced with the mouth of the net in the open condition;

DETAILED DESCRIPTION OF THE PREFERRED EMBODIMENT

Figures 2, 2A:
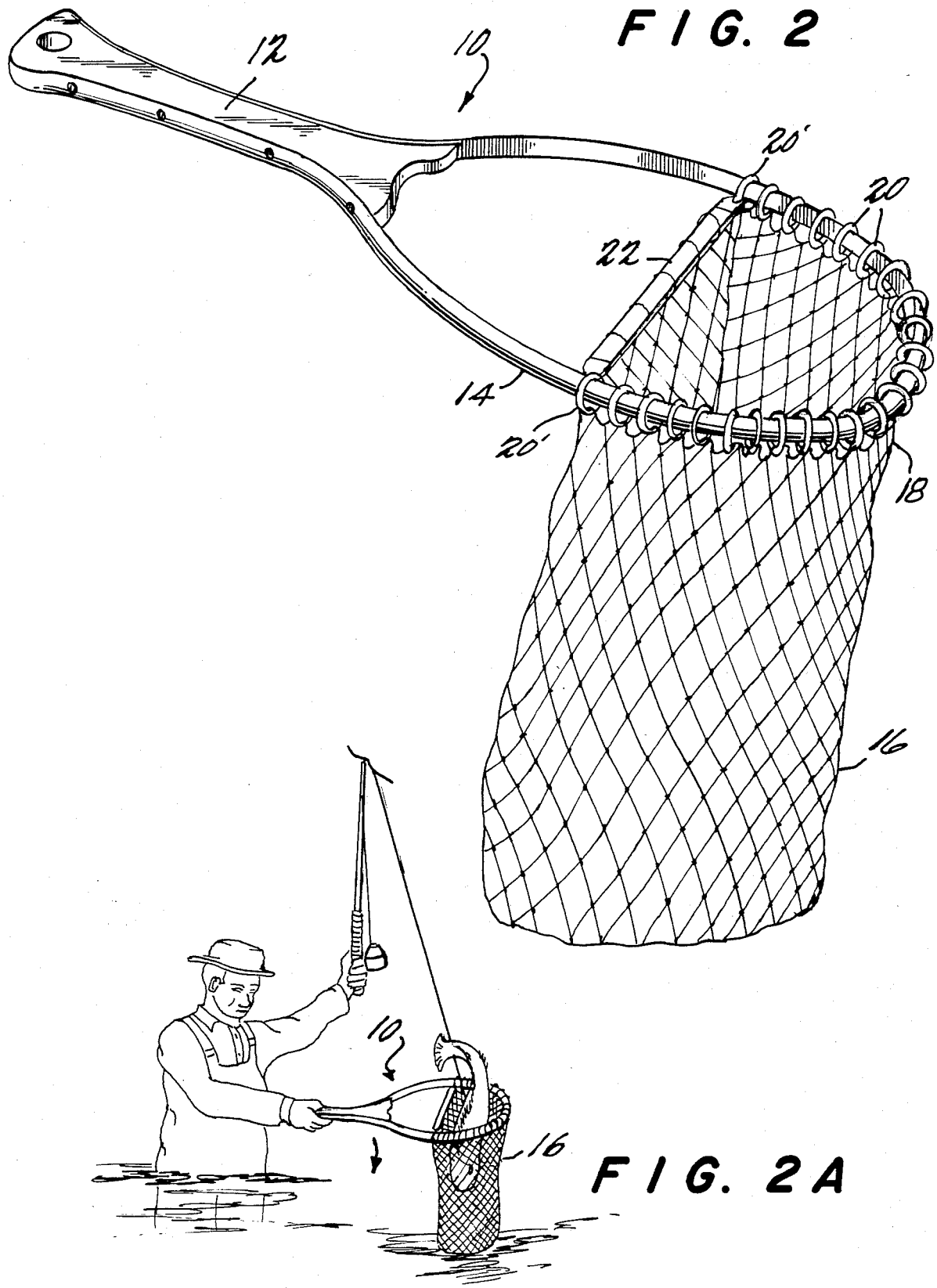
FIG. 2 is a further perspective view of the landing net showing the mouth of the net in an intermediate or partially closed condition.
FIG. 2A is a further view illustrating of the landing net showing the mouth of the net beginning to close as tension is applied thereto during the course of the landing operation.

Referring now to the drawings, there showing a landing net structure 10 including an elongated handle 12 and a rigid hoop 14 secured to the handle. As readily seen in the drawings the hoop is of a generally oval outline shape with the handle being aligned with the long axis of the oval outline. In the structure illustrated, both the handle and the hoop are made of wood, the hoop portion in particular being smoothly finished although it will be appreciated that the handle and the hoop can be made of other materials such as metal. A net 16 made of an open mesh fabric and formed into a bag-like shape is provided with a openable top portion 18 defining the mouth of the net. A plurality of connector means each in the form of a ring-like loop 20 are secured at spaced intervals to the top portion 18 of the net 16. Each such loop 20 embraces the rigid hoop 14 and is freely slideable thereon. Each ring-like loop 20 is smoothly finished and sufficiently large as to allow the free travel thereof along the rigid hoop 14. In the case where hoop 14 is made of wood, the loops 20 may conveniently be made of metal to provide for relatively low frictional contact therebetween; in the case where hoop 14 is made of metal, the loops 20 may be made from a suitable plastic material such as nylon, again to provide for a relatively low coefficient of friction between the two.

It will therefor readily be seen that the spaced apart loops 20 pendantly secure the net to the hoop 14. Furthermore, it will readily be seen from an inspection of FIGS. 1-3 that the connector means or loops 20 are moveable from a first relative Positional arrangement as shown in FIG. 1 wherein loops 20 are spaced apart about the hoop 14 to define the open mouth position of the net 16, to a second relative positional arrangement wherein the loops 20 are grouped together on hoop 14 to define the closed mouth position of the net as best illustrated in FIGS. 3 and 3A. An intermediate position, i.e. with the mouth of the net 16 partially closed, is illustrated in FIGS. 2 and 2A.

It will be seen from the drawings that the handle 12 is secured to the hoop 14 such as to block the travel of loops 20 completely around the hoop 14. The precise manner of securement of the handle to the hoop is, per se, not a part of the present invention and any suitable manner of securement will suffice provided it is capable of yielding the necessary strength and rigidity.

It is of importance to note that an elastic member 22 is connected between that pair of loops 20 which, as illustrated in FIG. 1, are positioned on opposing sides of and most closely adjacent to the region of securement of the handle of the hoop when the net is in the open mouth position. These two loops, which are designated as 20', are spaced apart from each other around the top portion of the net by a distance which is somewhat greater than the spacing between the remaining loops 20 thereby to make allowance for the space taken up by the region of securement of the handle 12 to the hoop 14 as best illustrated in FIG. 1.

Figures 3, 3A:
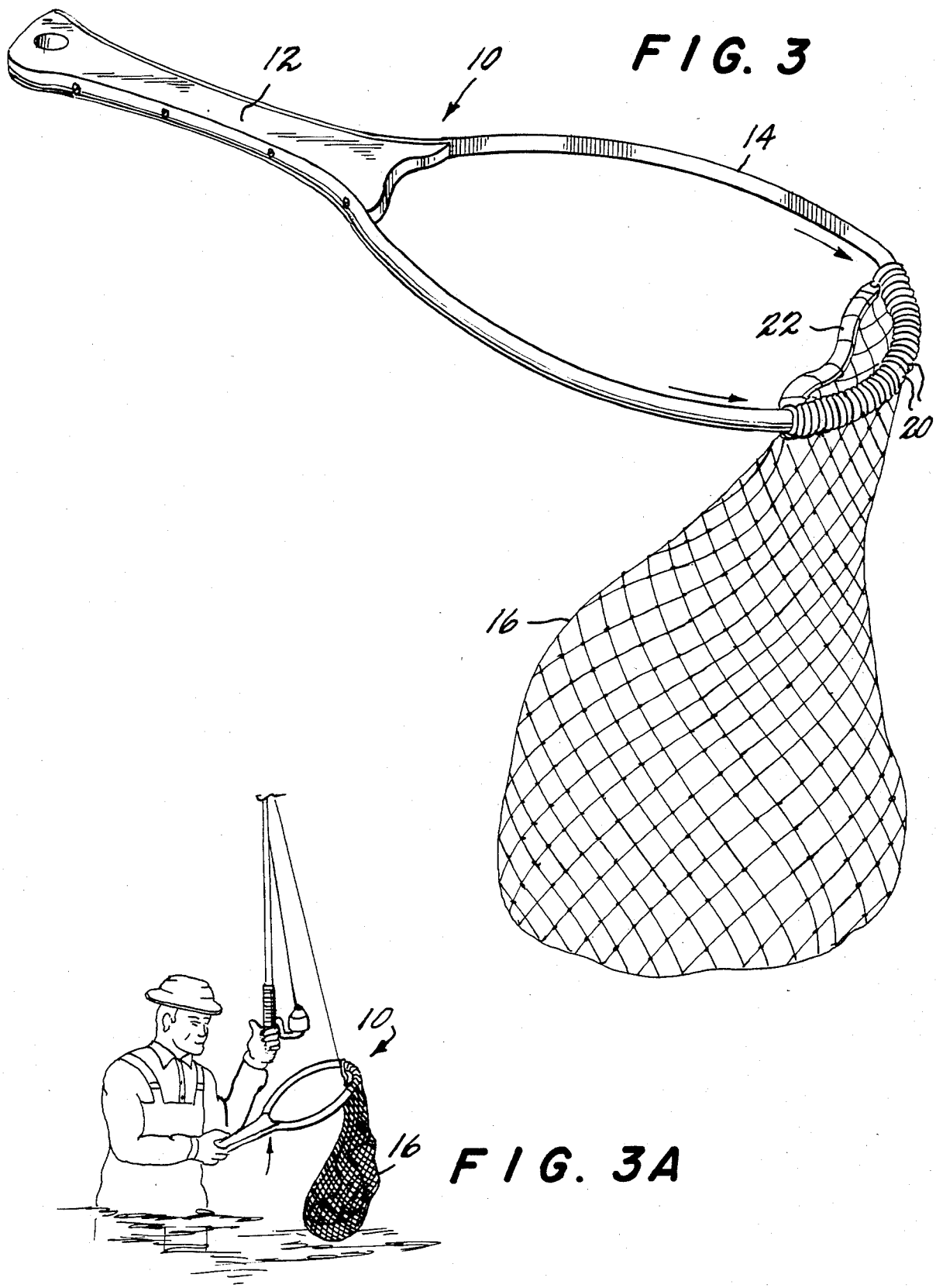
FIG. 3 is a further perspective view of the landing net structure showing the mouth of the net in the fully closed condition.
FIG. 3A is a further view illustrating the final phase of the landing procedure with the mouth of the net fully closed and the fish securely trapped in the net.

It will readily be seen from an inspection of FIGS. 1-3 that as the loops 20 are made to slide along the hoop 14 from the positional arrangement illustrated in FIG. 1 wherein loops 20 are spaced apart to define the open mouth condition of the net, to the positional arrangement shown in FIG. 3 wherein the loops 20 are closely grouped together to define the closed mouth condition of the net, that the distance between the above noted loops 20', between which elastic member 22 is connected, is varied substantially owing to the oval shape of the hoop. It is noted in FIG. 1, in the full open mouth condition of the net 16, that the elastic member 22 is in a relaxed non-tensioned condition. However, as the loops 20 are made to slide around the hoop 14, the spacing between loops 20' increases thus placing the elastic member 22 in tension and causing it to stretch. Then, as the loops 20 move further around hoop 14 toward the closely grouped relationship illustrated in FIG. 3 the elastic member 22, because of its tensioning action on rings 20', assists in gathering the loops 20 together and, as illustrated in FIG. 3, helps to retain the mouth of the net 16 in the closed condition. Hence, in going from the open mouth condition of net 16 to the closed mouth condition as illustrated in FIG. 3 the elastic member 22 goes from a relaxed condition to a progressively more tensioned condition and thence to a less tensioned condition and finally to a relaxed condition again as shown in FIG. 3. By virtue of this action, the net is thus resiliently retained in both the open mouth and closed mouth positions thereof. In order to move the mouth of the net from the closed mouth position in FIG. 3 to the open position illustrated in FIG. 1, forces are applied manually to the loops 20' thereby to draw them around the hoop into the open mouth condition of the net.

The above noted elastic member 22 preferably comprises an elongated strip of elastomeric material such as rubber. It may be covered with an elasticized fabric to protect it from the elements and rapid deterioration. The elasticity or "spring constant" of the elastic element should also be selected so that the movement between the open mouth condition of FIG. 1 and the closed mouth position of FIG. 3 and vice versa is neither too difficult nor too easy. It may be thus be desireable to carry out a few routine "trial and error" experiments to determine the most appropriate lengths for the elastic member 22 as well as the most appropriate "spring constant" once the dimensions and shape of the hoop have been established, thereby to provide the overall best action.

In using the invention, during the initial landing stage as illustrated in FIG. 1A, the net 16 is in the full open mouth condition. Then, as shown in FIG. 2, as the fish is lowered into or scooped up in the net 16, the tension forces exerted on the net cause loops 20' to slide around on hoop 14 to at least partially close the mouth of net 16. The fisherman may find that this action is enhanced by tilting the hoop 20 downwardly to a certain degree. This action then continues until the closed mouth condition of the mouth 16 is achieved as in FIGS. 3 and 3A, at which point the hoop 14 may be tilted upwardly by the fisherman to clear the net and the entrapped fish from the water without fear of the mouth of the net being inadvertently opened, by virtue of the retaining action provided by elastic member 22.

It is believed that a further, more detailed description of the use of the net structure is unnecessary and readily apparent from an inspection of the drawings taken in conjunction of the above description.

I claim:

1. A net structure comprising a handle, a rigid hoop secured to said handle, a flexible bag having an openable top portion defining the mouth of the bag, a plurality of connector means secured at spaced intervals to said top portion of the bag, said connector means also being freely slidably attached to said rigid hoop to pendantly secure said bag to said hoop, said connector means being movable from a first relative positional arrangement wherein said connector means are spaced apart about said hoop to define the open mouth position of the bag to a second relative positional arrangement wherein said connector means are grouped together on said hoop to define the closed mouth position of the bag, and an elastic member connected between selected ones of said connector means such that as said connector means are made to slide along said hoop between said first and second relative positional arrangements, the distance between said selected ones of said connector means varies such that said elastic member is first made to increase in length and then allowed to decrease in length and at least partially relax whereby to assist in resiliently retaining said bag in both the open mouth and closed mouth positions thereof.

2. The net structure according to claim 1 wherein said handle is secured to said hoop such as to block the travel of said connector means completely around said hoop, and said elastic member being connected to the members of a selected pair of said connector means which, in use, are positioned on opposing sides of and most closely adjacent to the region of securement of the handle to the hoop when the bag is in the open mouth position.

3. The net structure of claim 2 wherein said bag is of an open-mesh fabric and said connector means each comprises a ring like loop which embraces said rigid hoop and is freely slidable thereon.

4. The net structure of claim 1, wherein said elastic member comprises an elongated strip of an elastomeric material.

5. The net structure of claim 1, wherein said hoop is of a generally oval outline shape with said handle being aligned with the long axis of the oval outline.

6. A net structure comprising a handle, a rigid hoop secured to said handle, a flexible bag having an openable top portion defining the mouth of the bag, a plurality of connector means secured at spaced intervals to said top portion of the bag, said connector means also being freely slidably attached td said rigid hoop to pendantly secure said bag to said hoop, said connector means being movable from a first relative positional arrangement wherein said connector means are spaced apart about said hoop to define the open mouth position of the bag to a second relative positional arrangement wherein said connector means are grouped together on said hoop to define the closed mouth position of the bag, and an elastic member connected between selected ones of said connector means such that as said connector means slide along said hoop between said first and second relative positional arrangements, the distance between said selected ones of said connector means varies such that said elastic member first increases in length and then decreases in length and thus acts to resiliently bias said bag toward either the open mouth or closed mouth position thereof.

7. The net structure according to claim 6 wherein said handle is secured to said hoop such as to block the travel of said connector means completely around said hoop, and said elastic member being connected to the members of a selected pair of said connector means which, in use, are positioned on opposing sides of and most closely adjacent to the region of securement of the handle to the hoop when the bag is in the open mouth position.

8. The net structure of claim 7 wherein said bag is of an open-mesh fabric and said connector means each comprises a ring like loop which embraces said rigid hoop and is freely slidable thereon.

9. The net structure of claim 6, wherein said elastic member comprises an elongated strip of an elastomeric material.

10. The net structure of claim 6, wherein said hoop is of a generally oval outline shape with said handle being aligned with the long axis of the oval outline.

* * * * *